United States Patent Office 3,556,727
Patented Jan. 19, 1971

3,556,727
PURIFICATION OF AQUEOUS HYDROGEN PEROXIDE SOLUTIONS CONTAINING DISSOLVED ORGANIC COMPOUND BY USE OF NONIONIC POROUS RESIN
Pierre Thirion, Poisat par Eybens, France, assignor to La Societe dite Oxysynthese
No Drawing. Filed July 16, 1968, Ser. No. 745,102
Claims priority, application France, Aug. 1, 1967, 116,485
Int. Cl. C01b *15/02;* C07c *49/68*
U.S. Cl. 23—207                                10 Claims

ABSTRACT OF THE DISCLOSURE

A process for the organic purification of aqueous solutions of hydrogen peroxide containing organic compounds possibly dissolved in the presence of mineral compounds, wherein the said aqueous solutions are treated with adsorbent, porous, synthetic resins deprived of chemical functions, obtained by simple polymerisation or copolymerisation, with a high specific surface.

---

The present invention relates to the organic purification of aqueous solutions of hydrogen peroxide.

The major part of the hydrogen peroxide produced at the present time is obtained by a cyclic synthesis process applied to quinone derivatives dissolved in a complex organic solvent, such as an aromatic hydrocarbon in admixture with an ester or an alcohol.

According to this cyclic process, the organic solution of the quinone compound, called the working solution, is successively subjected to a hydrogenation, with molecular hydrogen in the presence of a catalyst, in order to convert the quinone, such as anthraquinone or its derivative, into corresponding hydroanthraquinone; to an oxidation with atmospheric oxygen of the hydroanthraquinone or its derivative into hydroperoxyanthraquinone; then to an extraction of this working solution with water, with regeneration of the anthraquinone or its derivative and simultaneous formation of an aqueous solution of hydrogen peroxide.

The aqueous and organic solutions, which are insoluble in one another, are separated into two separate phases. However, this insolubility is not strictly complete and the aqueous solution of hydrogen peroxide can contain from 100 to 1,000 mg. per litre and sometimes even more of dissolved organic products.

These dissolved products can be either normal constituents of the organic solution, products of reduction of these same constituents, generated at the time of the catalytic hydrogenation of this solution, products of oxidation or of peroxidation by the hydrogen peroxide, constituents of the organic solution, hydrolysis products and finally products which have undergone simultaneously several of the preceding chemical transformations.

In order to improve the quality of the hydrogen peroxide solution and to impart to its an increased commercial value, it is expedient to cause it to undergo one or more purification operations in order to extract all or part of the organic impurities.

Certain methods have already been proposed for obtaining this result, such as distillation, liquid-liquid extraction by washing with various solvents which are immiscible with the aqueous solution of hydrogen peroxide, adsorption on various substances, among which are to be mentioned active carbon, alumina, magnesia, the vinyl polymers, and also the treatment with ion exchanger resins and more especially anionic resins.

As regards the vinyl polymers which are claimed in French Pat. 1,163,055 of the Sept. 11, 1956 in the name of Columbia Southern, it is only a question of a decolorisation, the dissolved organic compounds being in actual fact not retained.

The use of ion exchanger resins has formed the subject of a certain number of patents, such as French Pat. 1,193,669 of the Feb. 6, 1957, in the name of Laporte Chemicals.

In these patents, there is described the use of anionic (basic) resins, that is to say, resins having electro-positive groups such as $-N^+R_3$, capable of fixing the anions, whatever may be their nature, and thus in particular the anions of the organic acids.

The passage of the aqueous solution of hydrogen peroxide over such resins causes an only partial purification of the solution, which purification can be followed by the decrease in "dissolved organic carbon" and by the increase of the pH value.

The use of these resins does however have the disadvantage of causing a more or less serious decomposition of the hydrogen peroxide, due to their alkalinity, because these are actually free bases.

In order undoubtedly to obviate this disadvantage, British Pat. No. 924,625, filed on the July 1, 1959 in the name of Pittsburgh Plate Glass, particularly suggests the use of anionic resins which are no longer in the form of a free base, but salified by very weak acids, of which the dissociation constant is lower than that of the organic acids contained in the aqueous solutions of crude hydrogen peroxide.

The examples given in these patents show that these methods only lead to a partial purification. By way of example, this purification does not exceed 40%, according to the aforementioned British Patent, and the purifying capacity of one of these resins, marketed under the mark "Amberlite IRA 400," an anionic gel in carbonate form, is 5,000 mg. of carbon per litre of resin.

All the known procedures regarding purification treatments of the aqueous solutions of hydrogen peroxide by ion exchanger resins are based on these ionic exchange properties. However, these resins are only able to lead to a limited purification, because a large part of the organic impurities solubilised in the aqueous solutions of hydrogen peroxide is incapable of ion exchange with the ion exchanger resins, either because these impurities are not ionisable or because their very low dissociation constant does not permit of sufficiently rapid reaction.

According to the present invention, there has now been found an exclusively organic purification process for aqueous solutions of hydrogen peroxide, containing dissolved organic compounds in the possible presence of mineral compounds, which represents an outstanding technical advance as compared with the purification on ion exchanger resins, in that it permits of achieving a very high organic purification level and an exceptional purification capacity, in that it is specific of the organic purification, without interfering in any way with the mineral purification, and does not affect the dissolved mineral products and in particular the mineral stabilisers of the hydrogen peroxide.

This new process is characterised in that the aqueous solutions of hydrogen peroxide are treated with adsorbent porous synthetic resins, deprived of chemical functions, obtained by polymerisation or copolymerisation.

These nonionic adsorbent porous resins used according to the invention physically retain a very large part of all the organic products dissolved in the said aqueous solutions whatever may be their origin.

The adsorbent, porous polymerisation products, which are deprived of chemical functions, absolutely unsuitable for ion exchange and of which the specific surface in m.$^2$/g. is high, being higher than 100 and preferably higher than or equal to 300, are particularly well-suited for carrying out the process of the invention.

It could have been considered that ionic resins of relatively large specific surface (several times ten m.$^2$/g.) would be efficient. However, it is proved that firstly their efficiency, although superior to that of the resins of the gel type (0.1 m.$^2$/g) remains very decidedly below that of nonionic resins and that secondly the most efficient of them, namely, the anionic resins, are completely unsuitable for use, because of the decomposition of the hydrogen peroxide which is caused thereby. This phenomenon, already referred to in several patents, limits the practical field of use of the process.

On the contrary, the use of non-ionic resins does not involve any necessity of working at temperatures and/or concentrations of hydrogen peroxide other than the normal limits of industrial practice.

Finally, experience has shown that the effective life of the ionic resins in contact with hydrogen peroxide solutions is much shorter than that of the nonionic resins.

In the process according to the invention, the aqueous solutions of hydrogen peroxide can be treated without any disadvantage at temperatures which extend up to 30° C. and higher, and for strengths which are up to 75% by weight of $H_2O_2$.

It is possible to work either with separate batches or in a continuous manner.

One variant of the invention makes it possible to achieve the removal of organic compounds of acid character while preserving the advantages of the purification with adsorbent resins deprived of chemical functions and with a high specific surface.

Such compounds are formed in the secondary reactions already referred to, particularly that of hydrolysis and/or oxidation of solvents of quinones. The transfer of these compounds from the organic phase into the aqueous phase is obviously promoted by their hydrophilic character.

French Pat. 1,193,669, which has already been referred to, claims the use of ion exchanger resins for the removal of such compounds. However, the resins which theoretically are suitable are strong bases which decompose the hydrogen peroxide. In the form of acid salts with an ionic force lower than that of the acids to be fixed, as claimed in the previously mentioned British Pat. 924,625, these resins can only be used practically at low temperature or for very small strengths of hydrogen peroxide.

On the contrary, the removal of these compounds of acid character by the resins used in the present invention does not present any difficulties.

However, in order to obtain the best efficiency as regards removal of these acid products, these latter must not be salified by mineral bases, as has been established by the invention.

The anthraquinone synthesis process makes use of mineral salts (catalysts, stabilisers, passivating agents), and this involves the presence of cations in variable proportions in the hydrogen peroxide solutions.

In order to improve still further the purification efficiency as regards these acid compounds, it is possible with advantage to have the treatment on nonionic, porous, adsorbent resin preceded by a treatment on cationic resin with a strong acid character, preferably a styrene-divinylbenzene copolymer with a high content of DVB and sulphonic radicals.

It is to be noted that this preliminary treatment does not affect either the stability of the hydrogen peroxide nor the stabilising power of the mineral anions introduced in the form of a salt and unaltered by this treatment.

In addition, this treatment has the advantage of protecting the nonionic resins against a possible soiling by insoluble or pseudo-soluble mineral impurities, which would reduce its efficiency.

Finally, it is necessary to refer to the simplicity of the procedure, since if so desired, it is possible to use and regenerate the two resins in the same apparatus, whether the working procedure is continuous or intermittent.

For this purpose, the resins are disposed in a column in which they are separated by density, the cationic resin being the heavier. The hydrogen peroxide solution is supplied at the base. In order to regenerate the resins, a strong mineral acid is used for the cationic resin and an alcohol which is very soluble in water is used for the nonionic resin.

By way of example, the procedure is in the following order:

(a) draining off the solution,
(b) rinsing with water,
(c) washing with alcohol,
(d) rinsing with water,
(e) washing with a strong acid,
(f) rinsing with water.

This working procedure, recommended for obtaining the best result in a mixed bed, does not limit the invention. All the variants which make use of a very soluble alcohol and a strong acid remain within the scope of the invention.

Examples which illustrate the invention are hereinafter given in nonlimiting manner and prove the technical advance which results from the use of non-ionic porous resins.

EXAMPLE 1

In this test, there is measured the adsorption capacity of the ionic resin which is known under the commercial mark "Amberlite IRA 401," filed by firm Röhm and Haas, a styrene porous gel, quaternary ammonium in chloride form, with a specific surface in m.$^2$/g. "smaller" than 0.1.

70 ml. of the above resin are placed in a glass column with a diameter of 30 mm., said resin occupying a height of 100 mm. After washing with water, a 35% by weight hydrogen peroxide solution is continuously introduced in an upward direction, said solution containing 310 mg./l. of soluble organic carbon and being introduced at the rate of 170 ml., i.e. 2.4 volumes of solution per volume of resin and per hour. The whole of the treated solution is analysed after passage of 1,400 ml. of hydrogen peroxide solution, i.e. 20 volumes per volume of resin. It does not contain more than 180 ml. of soluble organic carbon. The rate of purification is thus 130:310, i.e. 42%.

Under the particular conditions of this test, the purification capacity of this resin (Cl form), related to the litre of resin, is calculated as follows:

$$20 \times (310 \text{ mg./l.} - 180 \text{ mg./l.}) = 2600 \text{ mg.}$$
of carbon/litre of resin.

EXAMPLE 2

In order to prove the importance of the specific surface in the case of the ion exchanger resins, the previous test is repeated, replacing the "Amberlite IRA 401" resin by "Amberlite IRA 911" resin, which is anionic resin in chloride form, marketed by the same firm. This resin is said to be "macro-crosslinked," which imparts to it a very large specific surface: about 70 m.$^2$/g.

The preceding test is then repeated in similar manner. The solution to be purified contains 40% by weight of hydrogen peroxide and 420 mg./l. of soluble organic carbon.

After having treated 2,500 ml. of solution—i.e. 36 volumes per volume of resin—the test is stopped and analysis of the purified solution gives 335 mg./litre of soluble carbon.

The purification capacity of this resin is thus:

$$36 \times (420 - 335 \text{ mg./l.}) = 3,000 \text{ mg. of carbon}$$
per litre of resin Examination of the two preceding examples shows that:

the salified ion exchange resins have small adsorption capacities;

this capacity, contrary to the resin deprived of chemical functions, is practically independent of their specific surface.

In addition, we observed a certain instability at ambient temperature of the hydrogen peroxide in the presence of these anionic resins salified with a strong acid. In the carbonate form, this instability is much more pronounced and exploitation of this form is dangerous.

EXAMPLE 3

70 ml. of nonionic resin, known under the commercial mark "Amberlite XAD 1," filed by firm Röhm and Haas, this being a polymeric macro-crosslinked resin of styrene-divinylbenzene, with a specific surface in m.$^2$/g. of 100 and a mean pore diameter of 205 A., are introduced into the column described in the preceding example. This resin is washed beforehand in the following manner:

with water in an upward direction, for freeing it from resin dusts, with 200 ml. of methanol, in order to extract the remaining organic impurities, and with water, until the elimination of methanol is complete.

A 42% by weight aqueous solution of hydrogen peroxide, containing 320 mg./litre of soluble organic carbon, is then introduced in an upward direction at a rate of 350 ml./hour, i.e. 5 volumes of solution per volume of resin and per hour. An analysis carried out on the purified solution, a fraction which is between 50 and 100 ml., indicates a content of soluble carbon of 90 mg./l. This content then increases regularly, in order to reach 240 mg./l. at the 2,000th ml. of purified solution (30 volumes/volumes of resin).

This increase is then much slower and the experiment is stopped at the 3,000th ml. of purified solution (43 volumes/volume) with a final content of soluble carbon of 250 mg./litre and an average content of 200 mg./l. In practice, the capacity of this resin is from 5,200 to 5,500 mg. of carbon per litre of resin.

By carrying out a complete saturation of this resin, its capacity could be higher than 6,000 mg. of carbon per litre of resin.

EXAMPLE 4

The test of Example 3 is repeated with the same solution of crude hydrogen peroxide, but replacing the resin by another nonionic resin which is known under the commercial mark of "Amberlite XAD 2," filed by firm Röhm and Haas of Philadelphia, a styrene divinylbenzene polymer with a specific surface in m.$^2$/g. of 300 to 330, and with a mean pore diameter between 85 and 90 A. The same hydrogen peroxide solution is purified. The 100–200 ml. fraction indicates a carbon content of 70 mg./l. This quantity then increases very slowly, and then after the purification of 3 to 4,000 ml. of solution, it is observed that this increase of the carbon is accelerated. After passage of 6,600 ml. of hydrogen peroxide solution (94 volumes/volume of resin), the carbon content is 260 mg./l. The experiment is stopped and the mean content of the purified solution is then 140 mg./l. of soluble carbon.

The resin known under the commercial mark of "Amberlite XAD 2" is capable of purifying at least 100 volumes of aqueous hydrogen peroxide solution per volume of resin. Its adsorption capacity, under the above conditions, is at least 16,000 mg. of soluble carbon per litre of resin.

It will be noted that the ratio of the adsorption capacities (about 3/1) of the resin of this example to that of the preceding example is the same as the corresponding ratio of the specific surfaces. The diameter of the pores does not seem to have any practical importance.

EXAMPLE 5

After the experiment of Example 4, the solution is emptied from the column and the resin is rinsed with water. The resin known under the commercial mark of "Amberlite XAD 2" is then regenerated with 200 ml. of methanol introduced from top to bottom at a rate in the region of 15 ml. per minute. The methanol retained on the column is drained off and washing is carried out with demineralised water until there is complete disappearance of the methanol (800 to 1,000 ml. of water).

The purification experiment is then renewed on a 36% by weight hydrogen peroxide solution containing 400 mg./litre of soluble organic carbon, at the rate of 350 ml./hour, i.e. 5 volumes of solution/volume of resin/hour. The experiment is stopped after purification of 6,600 ml. of solution (94 volumes/volume of resin). The entire purified solution only contains 160 mg./l. of soluble carbon. Under the conditions described, the capacity of the resin known under the commercial mark "Amberlite XAD 2" is at least 23,000 mg. of soluble carbon-litre of resin.

The high concentration of organic impurities in the solution and a smaller mean polarity of these impurities could explain the greater capacity of the resin.

35 purification cycles of aqueous solutions of hydrogen peroxide were carried out on the "Amberlite XAD 2" resin column with each time a regeneration with methanol, without any lowering of the properties of this resin being observed.

The different examples given in the present application show two important advantages of the non-ionic adsorbent resins.

These resins do not in any way catalyse the decomposition of the hydrogen peroxide.

The dosage of the mineral salts ($P_2O_5$, $NO_3$, Al), effected in the aqueous solutions before and after purification, shows that the mineral salts are not retained by this resin; the mineral stabilisers normally introduced into the aqueous solution are thus not withdrawn from this solution.

The mineral purification can then be carried out, if so desired, on cationic and anionic resins, using the known processes.

The specificity of the nonionic adsorbent resins and in particular of the macro-crosslinked resins with respect to products containing carbon is of exceptional interest in the purification of aqueous solutions of hydrogen peroxide.

EXAMPLE 6

Purification of hydrogen peroxide on a semi-industrial scale, on nonionic porous resin The resin mentioned above in Example 4, namely, "Amberlite XAD 2," is installed in three columns with a diameter of 75 mm. and a height of 900 mm., each containing 4.4 dm.$^3$ of resin.

These three columns are placed in parallel and the purification is permanently carried out on two columns while the third column is stopped or undergoing regeneration. The rotation cycle of the columns being 24 hours, each column is in service for 16 hours (purification) and inoperative for 8 hours (regeneration).

The previous treatment of the resin is carried out in the manner described in Example 3.

The regeneration processes are effected in the following manner:

(1) Washing with water in a downward direction: 8 volumes per volume of resin, (2) Washing with methanol in a downward direction: 3 volumes per volume of resin; washing period 30 minutes, (3) Complete elimination of the methanol with water, i.e. 25 to 30 volumes per volume of resin.

The rate of flow of aqueous solution of 44% by weight hydrogen peroxide, treated continuously, is 40 litres/hour, i.e. 20 litres/hour per column. The specific rate of flow reaching the resin is thus:

$$\frac{20 \text{ l./h.}}{4.4 \text{ l.}} = 4.55 \text{ volumes per volume of } H_2O_2 \text{ and per hour}$$

bon content in the effluent is equal to that of the solution to be purified. The integral of the carbon curve gives the maximum quantity of carbon which the resin is capable of retaining. This value, brought to the unit of volume of the resin, expresses the capacity of the latter for a given level of carbon in the solution to be purified.

The results obtained are set out in the following table.

CAPACITY OF A NONIONIC RESIN WHICH IS ADSORBENT WITH RESPECT TO DIFFERENT ACIDS OR THEIR SALTS IN AQUEOUS SOLUTIONS WHICH MAY OR MAY NOT CONTAIN HYDROGEN PEROXIDE

| | | | | Capacity in g. of carbon per litre of moist resin | | | | | |
|---|---|---|---|---|---|---|---|---|---|
| | | | | Free acid | | | | Sodium salt | |
| | | No. of | G. of C/l. P 0.016 | In water | | In 40% $H_2O_2$ | | In water | In 40% $H_2O_2$ |
| E | M | C/acid equiv. | equiv. p./l. | pH | C | pH | C | pH | C | pH | C |
| 1 | 60 | 2 | 0.384 | 3.3 | 0 | | 0 | | 0 | | 0 |
| 2 | 80 | 4 | 0.768 | 3.4 | 3.2 | 1.6 | | 11.1 | 0.4 | 4.5 | |
| 3 | 166 | 4 | 0.768 | 2.7 | 5.6 | 1.2 | 4.6 | 9.35 | 0.2 | 4.3 | 0 |
| 4 | 122 | 7 | 1.344 | 3.1 | 29.3 | 1.75 | 21.0 | 11.2 | 0.1 | 4.1 | 4.9 |
| 5 | 122 | 8 | 1.536 | 4.7 | 39.8 | 1.5 | 42.0 | 9.8 | 11.6 | 5.2 | 41.6 |

E = tests with different acids: 1 = acetic acid; 2 = butyric acid; 3 = o-phthalic acid; 4 = benzoic acid; 5 = xylenol acid.
M = molecular weight.
C = Capacity.
No. of C/acid equiv. = number of carbon atoms per acid equivalent.

Per cycle, each column treats 20 l./h. × 16 hours = 320 litres of solution, i.e.

$$\frac{320}{4.4} = 73 \text{ volumes per volume of resin}$$

The overall daily flow is 320 l. × 2 = 640 litres of solution.

The experiment was stopped after 31 days of continuous operation (31 cycles) and after having treated 19,800 litres of hydrogen peroxide solution.

Before the treatment, this solution contained on average 340 mg./litre of solid organic carbon. After treatment, the average content was reduced to 140 mg./litre.

This lowering of 340−140 = 200 mg./litre corresponds to an average capacity of the resin, per cycle, of:

$$\frac{200 \text{ mg./litre} \times 320 \text{ litres}}{4.4 \text{ litres}}$$

= 14,400 mg. of carbon per litre of resin

During these 31 purification cycles, there was not observed:

any decrease in the efficency of the resin, or deterioration in its mechanical resistance, or any sign of decomposition of the hydrogen peroxide solution.

Analysis shows that the dissolved mineral substances have not been affected in any way by the treatment on the resin.

EXAMPLE 7

A glass column contains 70 ml. of moist bed of adsorbent, porous, nonionic resin, such as described in the preceding example. The resin bed has a diameter of 30 mm. and a height of 100 mm. Through the top of the column, there are introduced solutions which are to be purified and which contains 0.016 equivalent per litre of acid compound, which is free or salified with NaOH, at the rate of 700 ml./h., i.e. 10 volumes of solution per volume of resin bed and per hour.

After each fraction of about 140 ml., the content of carbon in the effluent is measured.

The introduction of solution is stopped when the car-

I claim:
1. A process for the organic purification of an aqueous solution of hydrogen peroxide containing organic compounds, comprising treating said aqueous solution with adsorbent, porous, synthetic nonionic resin, obtained by polymerisation and having a specific surface greater than 100 m.²/g.; separating $H_2O_2$ from the adsorbent resin and recovering said $H_2O_2$.

2. Organic purification process for aqueous solution of hydrogen peroxide, according to claim 1, characterised in that the specific surface of the resin is at least equal to 300 m.²/g.

3. Organic purification process for aqueous solution of hydrogen peroxide, according to claim 1, characterized in that the concentration of the starting aqueous solution is as high as 75% by weight of $H_2O_2$, and wherein said purification is carried out at a temperature as high as 30° C.

4. Organic purification process for aqueous solution of hydrogen peroxide, according to claim 1, characterised in that the said solution is treated continuously.

5. Organic purification process for aqueous solution of hydrogen peroxide, according to claim 1, characterised in that the said solution is treated as a batch.

6. Organic purification process for aqueous solution of hydrogen peroxide, according to claim 1, characterised in that the adsorbent, porous, synthetic resin is a nonionic styrene-divinylbenzene polymer.

7. Organic purification process for aqueous solution of hydrogen peroxide, according to claim 6, characterized in that the concentration of the starting aqueous solution is as high as 75% by weight of $H_2O_2$, and wherein said purification is carried out at a temperature as high as 30° C.

8. Organic purification process for aqueous solution of hydrogen peroxide, according to claim 1, characterised in that the said aqueous solution is subjected to a preliminary treatment with a strong acid cationic resin, and then is treated with said adsorbent, porous, synthetic nonionic resin having a high specific surface.

9. Organic purification process for aqueous solution of hydrogen peroxide, according to claim 8, characterized in that said cationic resin is a styrene-divinylbenzene polymer, having a high content of divinylbenzene and sulphonic radicals.

10. Organic purification process for aqueous solution of hydrogen peroxide, according to claim 8, characterised in that the preliminary treatment on cationic resin and the treatment on adsorbent, porous, synthetic nonionic resin with a large surface, are carried out in the same installation as the regeneration of the said resins.

References Cited

FOREIGN PATENTS 924,625  4/1963  Great Britain _____ 23—207

OSCAR R. VERTIZ, Primary Examiner

HOKE S. MILLER, Assistant Examiner

U.S. Cl. X.R.

260—369